United States Patent
Krebs et al.

(10) Patent No.: US 7,053,152 B2
(45) Date of Patent: May 30, 2006

(54) HIGHLY ELASTIC POLYURETHANE HOT-MELT ADHESIVES

(75) Inventors: Michael Krebs, Hilden (DE); Uwe Franken, Dormagen (DE); Thomas Moeller, Duesseldorf (DE); Thomas Morgeneyer, Bopfingen (DE); Hartmut Primke, Bopfingen (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 11/014,109

(22) Filed: Dec. 16, 2004

(65) Prior Publication Data

US 2005/0165163 A1 Jul. 28, 2005

(30) Foreign Application Priority Data

Dec. 24, 2003 (DE) ................................ 103 61 277

(51) Int. Cl.
*C08J 175/08* (2006.01)
(52) U.S. Cl. ........................................................ 525/63
(58) Field of Classification Search .................. 525/63
See application file for complete search history.

(56) References Cited

U.S. PATENT DOCUMENTS

| 3,686,146 A | 8/1972 | Goto |
| 3,931,077 A | 1/1976 | Uchigaki et al. |
| 4,585,819 A | 4/1986 | Reischle et al. |
| 4,775,719 A | 10/1988 | Markeveka et al. |
| 5,939,499 A * | 8/1999 | Anderson et al. ........... 525/440 |
| 2003/0045636 A1* | 3/2003 | Krebs et al. ................ 525/127 |
| 2003/0144454 A1* | 7/2003 | Krebs et al. ................. 528/44 |
| 2005/0222363 A1* | 10/2005 | Krebs et al. ................. 528/44 |

FOREIGN PATENT DOCUMENTS

| CA | 2 392 960 A1 | 6/2001 |
| CA | 2 463 586 A1 | 4/2003 |
| DE | 2014 170 | 10/1970 |
| DE | 32 36 313 A1 | 4/1984 |
| DE | 199 61 941 A1 | 7/2001 |
| DE | 101 50 722 | 4/2003 |
| DE | 102 35 090 A1 | 2/2004 |
| EP | 0 248 658 A2 | 12/1987 |
| EP | 0 293 602 B1 | 8/1994 |
| WO | WO 91/15530 A1 | 10/1991 |
| WO | WO 01/40342 A1 | 6/2001 |
| WO | WO 01/46330 A1 | 6/2001 |
| WO | WO 01/96436 A1 | 12/2001 |

OTHER PUBLICATIONS

Huber et al., "Shaping Reactive Hotmelts Using LMW Copolyesters", Adhesives Age, pp. 32-35 (Nov. 1987).

* cited by examiner

*Primary Examiner*—Jeffrey Mullis
(74) *Attorney, Agent, or Firm*—Stephen D. Harper

(57) ABSTRACT

A process for the production of a polyurethane hot-melt adhesive based on grafted polyester-polyether block copolymers with grafted-on hydroxyl groups and the reaction thereof with a stoichiometric excess of a polyisocyanate and the optional mixing thereof with further pre-polymers based on polyether polyols and polyester polyols is disclosed. By this process, the polyester-polyether block copolymers are firmly incorporated into the polyurethane matrix on curing, so that they are migration-proof. Highly-elastic hot-melt adhesives result, which, with optional foaming, are also suitable for the production of elastic seals.

16 Claims, No Drawings

HIGHLY ELASTIC POLYURETHANE HOT-MELT ADHESIVES

CROSS-REFERENCE TO RELATED APPLICATION

This application claims priority under 35 U.S.C. Section 119 to German Application DE 10361277.7, filed 24 Dec. 2003, incorporated herein by reference in its entirety.

FIELD OF THE INVENTION

The present invention relates to a process for the production of a reactive polyurethane hot-melt adhesive based on grafted polyester-polyether block copolymers, as well as hot-melt adhesives that have been produced according to this process.

DISCUSSION OF THE RELATED ART

Reactive polyurethane adhesives and sealants based on prepolymers with free isocyanate groups are characterized by an extremely good performance profile. Accordingly, new applications have increasingly been found for these adhesives/sealants in recent years. Compositions for such adhesives and/or sealants are already known from very many patent applications and other publications. Such compositions include in particular also reactive, one-component, moisture-hardening, polyurethane hot-melt adhesives.

These are solid at room temperature and are applied in the form of their melt as an adhesive; the polymeric constituents of the polyurethane hot-melt adhesives contain urethane groups as well as reactive isocyanate groups. Following the cooling of this melt after its application and the combining of the substrate parts that are to be joined, a rapid physical setting of the hot-melt adhesive due to its solidification first of all takes place. This is followed by a chemical reaction of the isocyanate groups that are still present with moisture from the surroundings, to form a cross-linked non-meltable adhesive. Reactive hot-melt adhesives based on isocyanate-terminated polyurethane prepolymers are described for example by H. F. Hüber and H. Müller in "Shaping Reactive Hotmelts Using LMW Copolyesters", Adhesives Age, November 1987, pages 32 to 35.

Laminating adhesives may either be similarly formulated like the reactive hot-melt adhesives, or are applied as one-component systems from solution in organic solvents. A further type of formulation consists of two-component solvent-containing or solvent-free systems, in which the polymeric constituents of one component contain urethane groups as well as reactive isocyanate groups, and the second component contains polymers or oligomers with hydroxyl groups, amino groups, epoxy groups and/or carboxyl groups. In the case of these two-component systems the isocyanate group-containing component and the second component are mixed immediately before the application, in the normal case with the aid of a mixing and metering system.

The main advantage of hot-melt adhesives compared to other adhesive systems lies in their ability to set rapidly, as well as the absence of water and solvents in their composition. Suitable moisture-hardening polyurethane hot-melt adhesives for bonding various carrier materials are already known.

For example, DE-A-32 36 313 describes a hot-melt adhesive that contains a prepolymeric isocyanate, a thermoplastic polymer as well as a synthetic resin of low molecular weight selected from the group comprising ketone resins, ketone-aldehyde condensation resins and/or hydrogenation products of acetophenone condensation resins. The prepolymeric isocyanate is a reactive polyurethane prepolymer of an aromatic diisocyanate and/or a prepolymer of this diisocyanate with a short-chain diol, as well as of a polyether or polyester that also contains a short-chain diol in addition to OH groups.

According to EP-A-248 658, polyurethane hot-melt adhesives can be produced from a reaction product of diisocyanates and crystalline polyester diols, in which the latter are synthesized from symmetrical aromatic dicarboxylic acids and have an acid content of at least 50 mole %. In preferred formulations the free isocyanate groups are blocked, for example by means of acetylacetone. This measure reduces the moisture sensitivity of the hot-melt adhesive and thus improves its storage stability, though on the other hand the setting rate is significantly reduced since, on account of the application temperature, the isocyanate group first of all has to be converted back into its reactive form by means of a deblocking step.

EP 0293602 B1 describes compatible mixtures for the formation of reactive hot-melt adhesives based on polyurethanes containing a reaction product of a polyalkylene polyol and an isocyanate as well as thermoplastic polymers with reduced polarity. Polymers of ethylene/vinyl monomers that have a vinyl monomer content of about 1 to 45 mole %, polyolefin polymers, radial A-B-A block copolymers, A-(B-A)$_n$-B block copolymers or A-B-A block copolymers in combination with compatible, tackifying resins, are specifically mentioned. It is stated that these adhesives have good heat stability, good initial adhesion strength, good storage stability and a good full cure.

U.S. Pat. No. 4,777,5719 describes a thermally stable, moisture-hardening hot-melt adhesive composition with a low viscosity and a very high initial strength and final strength. This composition is said to comprise a liquid polyurethane prepolymer, an aromatic or aliphatic/aromatic tackifying resin as well as a component containing polymeric polyethylene/vinyl monomers, which component is said to have an ethylene content of up to 55 wt. %.

U.S. Pat. No. 3,931,077 describes an adhesive composition containing a reactive polyurethane prepolymer, a thermoplastic resin based on ethylene/vinyl acetate copolymers, ethylene/acrylic acid copolymers, ethylene/acrylate copolymers, atactic polypropylenes or linear polyethylene/terephthalate polymers as well as a tackifying resin from the group comprising abietic acid resins (colophony resins), whose active hydrogen or double bonds have been wholly or partially removed by esterification, as well as terpene/phenol copolymers.

DE-A-2014170 describes thermoplastic polyurethanes that can be used as hot-melt adhesives. These compositions are reaction products of an isocyanate group-containing prepolymer with a polyester terminated with OH groups, in which the OH-terminated polyester should be used in excess. Such a hot-melt adhesive consequently can no longer be hardened by moisture under crosslinking.

WO 91/15530 describes a urethane hot-melt adhesive composition comprising an unreactive polyester/polyether copolymer and a polyisocyanate prepolymer of a polyol and a polyfunctional isocyanate with an isocyanate functionality of 2 or more. In the polyester/polyether copolymer the acid building block is said to be mainly a cyclic carboxylic acid. This hot-melt adhesive is said to have the characteristics of a thermoplastic hot-melt adhesive and of a reactive adhesive, is said to be flexible, and should be able to be used for bonding as well as for sealing functions. The disadvantage with such compositions is that they have a very high softening point and thus require a very high melting temperature in order to liquefy the adhesives.

WO01/96436 describes compositions containing reaction products of, a polyisocyanate with a polyester block copolymer and a process for their production. In this connection the carboxyl-terminated polyester block is said to be synthesized from aliphatic dicarboxylic acids selected from adipic acid, pimelic acid, suberic acid, azelaic acid, sebacic acid, undecanedioic acid, dodecanedioic acid or their mixtures, and dihydric alcohols selected from butanediol, hexanediol, octanediol, decanediol, dodecanediol or their mixtures, and at least one block should be formed by $(-(CH_2)_4-O-(CH_2)_4-)_o$, $(-C_3H_6-O-C_3H_6-)_o$, $(-C_2H_4-O-C_2H_4-)_p$, by the radical of a polybutadiene, polycarbonate or a polycaprolactone, or by a combination thereof. These compositions are suitable for use as a moisture-hardening hot-melt adhesive. The hot-melt adhesive composition may optionally also contain a reaction product of a polyisocyanate with a polyester polyol and/or a reaction product of a polyisocyanate with a polyether polyol. Such polyurethane hot-melt adhesive compositions are said to have good creep resistance values and interface adhesion values on plastics and to exhibit very high strength values.

WO01/46330 describes compositions containing reaction products of a polyisocyanate with a polyester/polyether copolymer and a process for their production. The polyester/polyether copolymer is said to be synthesized from the block of a carboxyl-terminated polyester and the block of a poly(oxytetramethylene)glycol, poly(oxypropylene)glycol, poly(oxyethylene)glycol or their copolymers. The carboxyl-terminated polyester block is according to the teaching of this specification synthesized from aliphatic or aromatic dicarboxylic acids selected from adipic acid, pimelic acid, suberic acid, azelaic acid, sebacic acid, undecanedioic acid, dodecanedioic acid, phthalic acid, terephthalic acid, isophthalic acid or their mixtures, and dihydric alcohols selected from ethylene glycol, propylene glycol, butanediol, diethylene glycol, triethylene glycol, dipropylene glycol, tripropylene glycol, hexanediol, octanediol, decanediol, dodecanediol or their mixtures. These compositions are said to be suitable as moisture-hardening hot-melt adhesives that exhibit good creep resistance values and interface adhesion values on plastics, and to have very high strength values.

The still unpublished DE 10235090.6 describes segmented polyurethane hot-melt adhesive compositions that comprise a reaction product of an hydroxyfunctional polyester/polyether block copolymer based on aromatic dicarboxylic acids with a stoichiometric excess of a polyisocyanate as well as a reaction product of a polyisocyanate with a polyester polyol and/or optionally a reaction product of a polyisocyanate with a polyether polyol. Optionally these compositions may also contain non-isocyanate-reactive thermoplastic polymers. To this end it is proposed in this specification to synthesize these hydroxyfunctional polyester/polyether block copolymers from aromatic dicarboxylic acids and short-chain alkanediols as well as optionally short-chain polyether polyol building blocks and long-chain polyether polyol building blocks in the corresponding stoichiometric ratio. Although such a procedure enables such hydroxyfunctional polyester/polyether block copolymers to be specifically produced, it nevertheless involves a considerable process technology effort and expenditure.

BRIEF SUMMARY OF THE INVENTION

Against the background of this prior art, the inventors have concerned themselves with the object of providing a simpler process for the production of reactive hot-melt adhesives, in which the polyester/polyether blocks can during the hardening of the reactive hot-melt adhesive react with the remaining reactive constituents so that they are fully incorporated into the adhesive matrix.

The invention provides a process for the production of a reactive hot-melt adhesive that includes the following process steps:

a) starting from a substantially non-functional polyester/polyether block copolymer, in a first stage hydroxyl group-containing grafting agents are grafted onto the block copolymer;

b) the resulting reaction product is reacted with a stoichiometric excess of a polyisocyanate and can then be packed in moisture-tight containers.

DETAILED DESCRIPTION OF CERTAIN EMBODIMENTS OF THE INVENTION

In a preferred embodiment, further polyether polyols, further polyester polyols and/or optionally hydroxyfunctional tackifying agents are added to the reaction product from step a) before its reaction with the stoichiometric excess of a diisocyanate, and this mixture of hydroxyfunctional constituents is reacted with a stoichiometric excess of polyisocyanates so as to form a mixture of isocyanate-functional prepolymers.

In a further preferred embodiment non-isocyanate-reactive auxiliary substances and additives may also be admixed with the mixture of hydroxyfunctional constituents. This mixing may optionally also take place after the reaction of the isocyanate-reactive constituents with the polyisocyanate.

The present invention also provides for the use of such compositions for bonding plane laminations, e.g., for kitchen work surfaces in the furniture industry, caravan side parts and panels in the building and construction industry, and in particular these adhesive compositions are suitable for application in which the adhesive has to be applied over a large surface area.

The aromatic dicarboxylic acids of the polyester/ether block copolymer suitable for the grafting may in this connection be selected, for example, from terephthalic acid, isophthalic acid, phthalic acid, dibenzoic acid, bis(p-carboxyphenyl)-methane, p-oxy(p-carboxyphenyl)benzoic acid, ethylene-bis(p-oxybenzoic acid), ethylene-bis(p-benzoic acid), tetramethylene-bis(p-oxybenzoic acid), 1,5-naphthalene-dicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, indenedicarboxylic acid, as well as their nuclear-substituted derivatives such as $C_1-C_{10}$-alkyl, halogen, alkoxy or aryl derivatives, p-(β-hydroxyethoxy)benzoic acid or their mixtures, in which the proportion of terephthalic acid preferably accounts for at least 75 wt. % of the dicarboxylic acid mixture. Optionally, aliphatic or cycloaliphatic dicarboxylic acids may be co-used in specific proportions for the production of the polyester-polyether block copolymer.

As the short-chain diol component of the polyester-polyether block copolymer, there are used in this connection, for example, $C_2$ to $C_{12}$ alkanediols, preferably ethylene glycol, propylene glycol, butanediol, hexanediol, octanediol or their mixtures.

As the polyether polyol building block for the block copolymer, there may be used, for example, polypropylene glycol, polyethylene glycol, copolymers of ethylene oxide and propylene oxide, poly(oxytretramethylene) glycol (poly-THF), 1,2-polybutylene glycol, or their mixtures. Preferred molecular weight ranges for the polyether polyol building blocks lie between 400 and 20,000, and are preferably in the range from 1000 to 6000.

The substantially non-functional polyester/polyether block copolymers suitable for the grafting and described hereinbefore have been produced on an industrial scale for a considerable time and are therefore particularly readily available; they are marketed, for example, by DuPont under the trade name "Hytrel".

The grafting of the unreactive polyester/polyether block copolymers may in this connection be carried out in a manner known per se either in suitable heatable stirred vessels or, preferably, in extruders. For this purpose the block copolymer is fed to a twin-screw extruder and a hydroxyfunctional grafting agent is added at temperatures generally between about 130° C. and about 250° C., preferably between about 130° C. and about 200° C., the residence time of the reactants in the extruder being generally between about 1 minute and about 3 minutes.

Suitable grafting agents include allyl alcohol, hydroxyethyl (meth)acrylate, hydroxypropyl (meth)acrylate, mercaptofunctional alcohols such as, e.g., mercaptoethanol, mercaptopropanol, or mercaptobutanol, cinnamyl alcohol, 1-butene-3,4-diol, 3-butene-1-ol, 2-butene-1,4-diol, 2,5-dimethyl-2,5-bis(tert.-butylperoxy)-hexyne-3 or bis-hydroxyalkyl disulfides such as, e.g., bis-(hydroxyethyl) disulfide or bis-(hydroxypropyl) disulfide as well as mixtures thereof. The amount of grafting agent(s) to be employed is governed by the desired hydroxyl number of the grafted polyester/polyether block copolymer and the molecular weight of the grafting agent, and typically about 0.5 to about 15 wt. %, preferably about 1 to about 10 wt. %, of grafting agent, referred to the amount of block copolymer employed, is used. With such amounts of grafting agent, hydroxyl numbers between about 1.5 and 10 mg/KOH are typically achieved.

The further optionally co-used polyols may in this connection be selected from a large number of relatively high molecular weight polyhydroxy compounds. Suitable as polyols are preferably polyhydroxy compounds with two or three hydroxyl groups per molecule, in the number average molecular weight range from about 400 to about 20,000, preferably in the range from about 1000 to about 6000. The polyols may be glass-like (amorphous) solids, crystalline, or liquid at room temperature. Examples include difunctional and/or trifunctional polypropylene glycols, though random and/or block copolymers of ethylene oxide and propylene oxide may also be used. A further group of preferably used polyethers are polytetramethylene glycols (poly(oxytetramethylene)glycol, poly-THF), which are produced, for example, by the acid polymerization of tetrahydrofuran, in which connection the molecular weight range of the polytetramethylene glycols is generally between about 600 and about 6000, preferably in the range from about 800 to about 5000. Also suitable as polyols are the liquid, glass-like amorphous or crystalline polyesters that can be produced by condensation of dicarboxylic and/or tricarboxylic acids such as, e.g., adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimeric fatty acids or their mixtures with low molecular weight diols and/or triols such as, e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimeric fatty alcohol, glycerol, trimethylolpropane or their mixtures. A further group of the polyols to be used according to the invention are the polyesters based on ε-caprolactone, also termed "polycaprolactones". Polyester polyols of oleochemical origin may however also be used. Such polyester polyols may be produced, for example, by complete ring opening of epoxidized triglycerides of an at least partially olefinically unsaturated fatty acid-containing fat mixture with one or more alcohols containing 1 to 12 carbon atoms, followed by partial transesterification of the triglyceride derivatives to form alkyl ester polyols with 1 to 12 carbon atoms in the alkyl radical. Further suitable polyols are polycarbonate polyols and dimeric diols (Henkel) as well as castor oil and its derivatives. Also, hydroxyfunctional polybutadienes, such as are obtainable for example under the trade name "Poly bd", may, like their hydrogenated analogs, likewise be used as polyols for the compositions according to the invention.

Also suitable as polyols are linear and/or slightly branched acrylic ester copolymer polyols, which may be produced for example by the free-radical copolymerization of acrylic acid esters or methacrylic acid esters with hydroxyfunctional acrylic acid compounds and/or methacrylic acid compounds such as hydroxyethyl (meth)acrylate or hydroxypropyl (meth)acrylate. On account of this method of production the hydroxyl groups in these polyols are as a rule randomly distributed, with the result that they are either linear polyols or slightly branched polyols with an average OH functionality. Although the difunctional compounds are preferred for the polyols, higher functional polyols may also be used, at least in minor amounts.

As polyisocyanates there may in principle be used a large number of aliphatic, cycloaliphatic or aromatic polyisocyanates.

Examples of suitable aromatic polyisocyanates include: all isomers of toluylene diisocyanate (TDI) either in isomer-pure form or as a mixture of several isomers, naphthalene-1,5-diisocyanate, diphenylmethane-4,4'-diisocyanate (MDI), diphenylmethane-2,4'-diisocyanate as well as mixtures of 4,4'-diphenylmethane diisocyanate with the 2,4' isomer or their mixtures with higher functional oligomers (so-called crude MDI), xylylene diisocyanate (XDI), 4,4'-diphenyl-dimethyldimethane diisocyanate, di- and tetraalkyl-diphenylmethane diisocyanate, 4,4'-dibenzyl diisocyanate, 1,3-phenylene diisocyanate, 1,4-phenylene diisocyanate.

Examples of suitable cycloaliphatic polyisocyanates are the hydrogenation products of the aforementioned aromatic diisocyanates, such as e.g. of 4,4'-dicyclohexylmethane diisocyanate ($H_{12}$MDI), 1-isocyanatomethyl-3-isocyanato-1,5,5-trimethylcyclohexane (isophorone diisocyanate, IPDI), cyclohexane-1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, p-TMXDI) and dimeric fatty acid diisocyanate. Examples of aliphatic polyisocyanates are tetramethoxybutane-1,4 diisocyanate, butane-1,4-diisocyanate, hexane-1,6-diisocyanate (HDI), 1,6-diisocyanato-2,2,2-trimethylhexane, 1,6-diisocyanato-2,4,4-trimethylhexane as well as 1,12-dodecane diisocyanate ($C_{12}$DI), most particularly preferred being in this connection diphenylmethane-4,4'-diisocyanate or diphenylmethane-2,4'-diisocyanate or their higher molecular weight adducts to diols with molecular weights below 1000, according to the teaching of WO01/40342 or DE-10150722.4.

In addition, unreactive thermoplastic polymers may be co-used in the production of the reactive hot-melt adhesives according to the invention. These include thermoplastic polyurethanes, thermoplastic polyester block copolymers, thermoplastic polyether amides or low molecular weight polymers of ethylenically unsaturated monomers. Specific examples of these are (co)polymers of one or more of the following monomers: $C_1$–$C_{18}$ alkyl esters of acrylic acid or methacrylic acid, acrylic acid, methacrylic acid, ethylene, vinyl acetate, vinyl propionate, vinyl versatate, vinyl ether, alkyl fumarates, alkyl maleates, styrene, alkylstyrene, acrylonitrile and/or butadiene or isoprene, as well as hydrogenation products of the last-mentioned diene copolymers, such as, e.g., styrene/ethylene/propylene or styrene/ethylene/butylene di-block or tri-block copolymers. Normally these thermoplastic materials have a relatively low molecular weight. Low molecular weight denotes in this connection a number average molecular weight below 60,000, and preferably the number average molecular weight of such thermoplastic polymers is between about 10,000 and about 40,000. "Unreactive" within the meaning of the present invention are all such thermoplastic materials that contain practically no Zerewitinoff-active hydrogen.

In addition the hot-melt adhesive compositions according to the invention may also contain tackifying resins, such as, e.g., abietic acid, abietic acid esters, terpene resins, terpene/phenol resins, poly-α-methylstyrene or aliphatic, aromatic or aromatic/aliphatic hydrocarbon resins or coumarone/indene resins. These tackifying resins may optionally contain active hydrogen atoms, so that they can be incorporated into the binder matrix of the hot-melt adhesive during reaction with the diisocyanates or polyisocyanates. Specific examples of such compounds are hydroxyfunctional esters of abietic acid or also hydroxylated terpene/phenol resins. In addition the hot-melt adhesive compositions may also contain fillers (e.g., silicates, talcum, calcium carbonates, clays or carbon black), thixotropic agents (e.g., bentones, pyrogenic silicic acids, urea derivatives, fibrillated or pulp short fibers), color pastes and/or pigments, and/or conductivity additives such as conductivity carbon blacks or lithium perchlorate.

Optionally the hot-melt adhesive compositions according to the invention may also contain plasticizers, provided that these plasticizers do not interfere with the functions of the remaining constituents. By way of example there may be mentioned the liquid phthalate plasticizers, plasticizers based on aromatic esters, such as, e.g., esters of benzoic acid, or also solid plasticizers such as dicyclohexyl phthalate, cyclohexane dimethanol dibenzoate and the like. Furthermore, the compositions according to the invention may in addition contain catalysts, stabilizers, antioxidants, UV absorption agents, waxes or coupling agents (e.g., based on organofunctional silanes), or adhesion-reinforcing polyisocyanates capable of migration according to the teaching of WO 01/40342, and other conventional auxiliary substances and additives.

The choice of the individual components of the adhesive composition is governed in this connection primarily according to the intended areas of use of these adhesives. In order to achieve the highly elastic properties of the hardened hot-melt adhesive, the adhesive should comprise hard segments and soft segments. The hard segments are primarily formed by the polyester groups of the grafted polyester-polyether block copolymer. For this reason a suitable block copolymer should preferably contain a large amount of terephthalic acid in the carboxylic acid mixture of the polyether/polyester block copolymer used for the grafting, preferably in this case at least about 75 wt. % of the whole carboxylic acid mixture. The "soft segments" of the polyester/polyether block copolymer used for the grafting should preferably consist of poly-THF, hydroxyfunctional polybutadiene and/or hydrogenated hydroxyfunctional polybutadiene, or also of polypropylene glycols. The further polyol components that are optionally co-used may in this connection be the aforementioned polyether polyols or polyester polyols.

In this connection the individual OH functional components may be reacted separately with the polyisocyanate and these reaction products may then be mixed, optionally under the addition of the unreactive auxiliary substances and additives. In a further modification the additions are carried out in sequence: a polyol component is added to the whole amount of polyisocyanate or to a large part thereof and reacted. Immediately following this the further polyol components are added, optionally under the addition of a further aliquot of the polyisocyanate. In the simplest case all polyol components are mixed and reacted jointly with the polyisocyanate.

Compared to the known prior art the production process according to the invention for hot-melt adhesive compositions can have the following advantages:

The hydroxyfunctional polyester/polyether block copolymers that are used can be produced in a simple way by a grafting reaction from commercially readily obtainable, non-functional polyester/polyether block copolymers.

On account of the reactive isocyanate groups the polyester/polyether block copolymer reaction product is incorporated firmly into the adhesive matrix, leading to a higher thermal stability and better hydrolysis resistance and better compatibility of the hot-melt adhesive compositions according to the invention. In addition the polyester/polyether block copolymer is incorporated in a migrationally stable and extraction-resistant manner in the matrix. For this reason the hot-melt adhesive compositions produced according to the invention are also suitable for producing foamed sealants that in the hardened state exhibit a high elasticity and ability to recover shape and do not contain significant amounts of readily extractable thermoplastic materials (unlike systems based on non-functional styrene/butadiene or styrene/isoprene tri-block copolymers and reactive polyurethanes known in the prior art).

Preferred hot-melt adhesive compositions according to the invention contain the following constituents:

i. about 5 to about 50 wt. %, preferably about 5 to about 30 wt. %, particularly preferably about 10 to about 20 wt. %, of the reaction product of a polyisocyanate and the grafted polyester/polyether block copolymer (component from process step a);

ii. about 5 to about 60 wt. %, preferably about 10 to about 40 wt. %, of the reaction product of a polyisocyanate with a polyester/polyol and/or a polyether/polyol, wherein this reaction product may also be produced from mixtures of polyester/polyols and polyether/polyols and polyisocyanates;

iii. 0 to about 30 wt. %, preferably about 5 to about 15 wt. % of a thermoplastic polymer (preferably not isocyanate-reactive);

iv. 0 to about 60 wt. %, preferably about 5 to about 40 wt. % of a tackifying resin; and v. optionally, one or more further auxiliary substances and additives selected from the group consisting of fillers, thixotropic agents, color pigments, conductivity additives, foaming and expansion agents, plasticizers, stabilizers and anti-aging agents, and coupling-promoting additives, in which the sum of all the composition constituents is 100 wt. %.

The hot-melt adhesive compositions according to the invention are suitable in particular for bonding plane laminations, e.g., kitchen work surfaces in the furniture industry, caravan side panels and panels in the building and construction sector, as well as for the production of foamed sealants, in which the propellant may either be the carbon dioxide formed from the isocyanate/water reaction, or an inert gas such as nitrogen or carbon dioxide is mixed in a known manner into the hot-melt adhesive composition before the extrusion of the hardenable composition.

The following examples are intended to illustrate the invention in more detail, though the choice of examples does not constitute any restriction on the scope of the subject matter of the invention: In the compositions all quantitative amounts refer to parts by weight unless otherwise stated.

EXAMPLES

HYTREL 3078, which is a polyester/polyether block copolymer based on terephthalic acid, 1,4-butanediol and polytetramethylene glycol from DuPont, was grafted with two different hydroxyfunctional grafting agents under the addition of 0.2 wt. % of TRIGONOX 145 (2,5-dimethyl-2,5-bis(tert-butylperoxy)-hexyne-3) in an industrial double-screw extruder at 200° C. The subsequent reaction of the hydroxyfunctional polymers with the diisocyanate was carried out in a stirred vessel under anhydrous inert conditions.

Example 1

As mentioned above, 3.5 wt. % of allyl alcohol (based on the amount of block copolymer employed) was used. A graft polymer with an OH number of 3.1, acid number <0.1, was formed. The residual content of allyl alcohol was less than 0.1% (limit of detection).

Example 2

In the same way as mentioned above, 2.5 wt. % of cis-2-butene-1,4-diol was used. A graft copolymer with an OH number of 10 and an acid number of 0.1 was formed; the residual content of cis-2-butene-1,4-diol in the copolymer was very much less than 100 μm/g (limit of detection).

In order to check the successful incorporation of the hydroxyl groups into the graft copolymer, poly-α-methylstyrene (KRISTALEX F 100, Eastman, softening point 96° to 104° C. according to the ring and ball method) was melted and in separate experiments identical amounts of the grafted copolymer from Examples 1 and 2 and, for purposes of comparison, ungrafted HYTREL 3078 were dissolved in the molten KRISTALEX. 0.34 wt. % of 4,4'-diphenylmethane diisocyanate (MDI) was then added to all three samples. A 500 μm-thick film was drawn from all three samples and stored for seven days at room temperature and under ambient conditions to effect moisture hardening. 75 g of methylene chloride were added to 10 g of the hardened films and treated for 16 hours on a set of rollers. The two samples of the reaction products of MDI and the graft copolymers of Examples 1 and 2 did not dissolve in methylene chloride, but only swelled with formation of a gel.

The comparison example of ungrafted HYTREL 3078, KRISTALEX F 100 and MDI dissolved completely in methylene chloride. From these experiments it is clear that the graft copolymers with the MDI produced according to the invention had undergone gel formation or crosslinking, whereas the ungrafted HYTREL 3078 had not undergone any crosslinking reaction.

Example 3

Production of a Prepolymer of Polyester/Polyol and Polyether/Polyol.

A polyurethane prepolymer containing ester and ether groups was formed from a mixture in a weight ratio of 1:2 of a partially crystalline hydroxyfunctional polyester based on adipic acid and hexanediol and poly-THF (molecular weight 2000) with 4,4'-diphenylmethane diisocyanate in an NCO:OH ratio of 2.5:1.

Example 4

Production of a Hot-melt Adhesive

A poly-α-methylstyrene (softening point 99° C. according to the ring and ball method, molecular weight about 1400) was heated in a stirred vessel to 190° C., and the graft copolymer of Example 1 was reacted at this temperature with 4,4'-diphenylmethane diisocyanate while stirring (NCO:OH ratio of 2.5:1). The reaction product dissolved completely in the poly-α-methylstyrene, and this was followed, while stirring at the same temperature, by the addition of an ethylene/vinyl acetate copolymer (vinyl acetate proportion: 50%, melt index (MFI, ISO 1133): at 190° C./21.2 N:3). After a completely homogeneous mixture was obtained the prepolymer according to Example 3 was added.

Hardened samples of the hot-melt adhesive produced in this way exhibited excellent elastic properties.

What is claimed is:

1. A process for producing a reactive hot-melt adhesive comprising the following process steps:
    a) grafting at least one substantially non-functional polyester-polyether block copolymer with one or more hydroxyl group-containing grafting agents to obtain a reaction product;
    b) reacting the reaction product from step a) with a stoichiometric excess of at least one polyisocyanate to form the reactive hot-melt adhesive.

2. A process according to claim 1, wherein at least one material selected from the group consisting of polyether polyols, polyester polyols and hydroxyfunctional tackifying agents is mixed into the reaction product from step a) before step b).

3. A process according to claim 1, comprising an additional step of mixing one or more non-isocyanate-reactive auxiliary substances or additives into the reaction product from step a).

4. A process according to claim 1, wherein the polyester-polyether block copolymer is selected from the group consisting of (i) polyester-ether block copolymers based on aromatic dicarboxylic acids and polypropylene glycols and/or polytetramethylene glycols and (ii) polyester-ether block copolymers based on polypropylene glycols and polytetramethylene glycols and carbonic acid.

5. A process according to claim 1, wherein the grafting agent is selected from the group consisting of allyl alcohol, hydroxyethyl (meth)acrylate, hydroxypropyl (meth)acrylate, mercapto-functional alcohols, cinnamyl alcohol, 1-butene-3,4-diol, 3-butene-1-ol, 2-buten-1,4-diol, and bis-hydroxyalkyl disulfides.

6. A process according to claim 1, wherein the grafting agent is used in a quantity of about 0.5 to about 10 wt. %, based on the amount of the polyester-polyether block, copolymer.

7. A process according to claim 1, wherein the grafting agent is used in a quantity of about 1 to about 5 wt. %, based on the amount of the polyester-polyether block copolymer.

8. A process according to claim 1, wherein the reaction product from step a) has a hydroxyl number between about 1.5 and about 10 mg/KOH.

9. A process according to claim 1, wherein the polyester-polyether block copolymer is a polyester/polyether block copolymer based on terephthalic acid, 1,4-butanediol and polytetramethylene glycol.

10. A process according to claim 1, comprising an additional step of transferring the hot-melt adhesive to a moisture-tight container.

11. A process according to claim 1, comprising an additional step of mixing into the hot-melt adhesive at least one material selected from the group consisting of thermoplastic polymers, tackifying resins, fillers, plasticizers, thixotropic agents, color pigments, catalysts, waxes, conductivity additives, foaming and expansion agents, stabilizers and anti-aging agents, and coupling promoting additives.

12. A process according to claim 1, wherein grafting step a) is carried out in an extruder.

13. A process according to claim 1, wherein grafting step a) is carried out in a twin-screw extruder at temperatures between about 130° C. and about 250° C. and residence times of between about 1 minute and 3 minutes.

14. A hot-melt adhesive obtained by a process according to claim 1.

15. An adhesive composition comprising:
   i. about 5 to about 50 wt. % of one or more reactive hot-melt adhesives obtained by a process according to claim 1;
   ii. about 5 to about 60 wt. % of one or more reaction products obtained by reacting one or more polyisocyanates with one or more reactants selected from the group consisting of polyester polyols and polyether polyols;
   iii. 0 to about 30 wt. % of one or more thermoplastic polymers;
   iv. 0 to about 60 wt. % of one or more tackifying resins; and
   v. optionally, one or more further auxiliary substances and additives selected from the group consisting of fillers, thixotropic agents, color pigments, catalysts, waxes, conductivity additives, plasticizers, stabilizers and anti-aging agents, foaming and expansion agents and coupling-promoting additives;

wherein the sum of all the composition constituents is 100 wt. %.

16. An adhesive composition comprising:
   i. about 5 to about 30 wt. % of one or more reactive hot-melt adhesives obtained by a process according to claim 1;
   ii. about 10 to about 40 wt. % of one or more reaction products obtained by reacting one or more polyisocyanates with one or more reactants selected from the group consisting of polyester polyols and polyether polyols;
   iii. about 5 to about 15 wt. % of one or more thermoplastic polymers which are not isocyanate-reactive;
   iv. about 5 to about 40 wt. % of one or more tackifying resins; and
   v. optionally, one or more further auxiliary substances and additives selected from the group consisting of fillers, thixotropic agents, color pigments, catalysts, waxes, conductivity additives, plasticizers, stabilizers and anti-aging agents, foaming and expansion agents and coupling-promoting additives;

wherein the sum of all the composition constituents is 100 wt. %.

* * * * *